DEVICE FOR PRODUCING AN OUTPUT SIGNAL PROPORTIONAL
TO THE QUOTIENT OF THE AMPLITUDES
OF TWO INPUT SIGNALS

Filed April 22, 1957 2 Sheets-Sheet 1

INVENTORS
FREDERIK WILLEM DE VRIJER
JOSUE JEAN PHILIPPE VALETON
BY
Frank R. Trifari
AGENT June 4, 1963 F. W. DE VRIJER ETAL 3,092,720

DEVICE FOR PRODUCING AN OUTPUT SIGNAL PROPORTIONAL
TO THE QUOTIENT OF THE AMPLITUDES
OF TWO INPUT SIGNALS

Filed April 22, 1957 2 Sheets-Sheet 2

INVENTORS
FREDERIK WILLEM DE VRIJER
JOSUE JEAN PHILIPPE VALETON

BY [signature]
AGENT

United States Patent Office 3,092,720
Patented June 4, 1963

3,092,720

DEVICE FOR PRODUCING AN OUTPUT SIGNAL PROPORTIONAL TO THE QUOTIENT OF THE AMPLITUDES OF TWO INPUT SIGNALS

Frederik Willem de Vrijer and Josué Jean Philippe Valeton, both of Eindhoven, Netherlands, assignors to North American Philips Company, Inc., New York, N.Y., a corporation of Delaware Filed Apr. 22, 1957, Ser. No. 654,313
Claims priority, application Netherlands June 2, 1956
5 Claims. (Cl. 235—195)

This invention relates to devices for producing an output signal proportional to the quotient of the amplitudes of two input signals. Such devices may, for example, be used in a television transmitter, for brightness correction or gamma correction of the image signals to be transmitted; they may also constitute or form part of a so-called matrix device for producing combined signals. Furthermore, they may inter alia be used in analog computers or similar counting apparatus or for continuous or intermittent control of a chemical or physical process.

The device according to the invention is characterized by the combination of a generator for producing a carrier oscillation, a phase-shifting network for shifting the phase of this carrier oscillation through 90°, two modulators to which carrier oscillation components having said phase difference are respectively supplied and serving each to modulate one of said input signals on the corresponding carrier oscillation component, adding means for producing a voltage vector proportional to the vectorial sum of the two modulated carrier oscillation components, a limiter for maintaining the amplitude of this vector at a constant level, and a detector synchronized to a first of said carrier oscillation components and serving to demodulate said vector, the arrangement being such that the phase of the limited vector depends only upon the ratio of the amplitude of the input signals so that the amplitude of the demodulated voltage vector is approximately proportional to the amplitude of the first input signal modulated onto said first carrier oscillation component, divided by the amplitude of the second input signal.

In order that the invention may be readily carried into effect, it will now be described in detail with reference to the accompanying drawings, in which.

Figure 1:
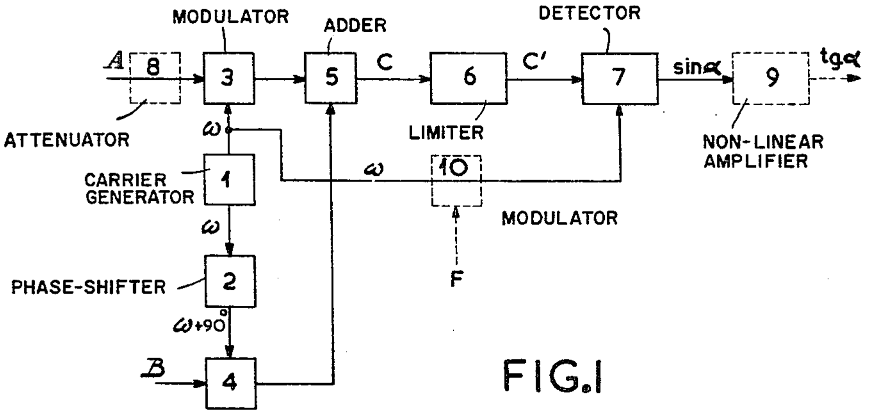
FIG. 1 is a block-diagram of a device according to the invention.
Figure 2:
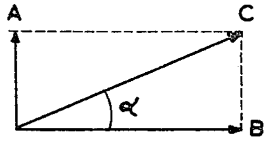
FIG. 2 is a vector diagram for explaining the operation of this device.

As shown in FIG. 1, the device comprises a generator 1 producing a carrier oscillation of a frequency $\omega$, a phase-shifting network 2, by which the phase of this carrier oscillation is shifted through 90°, and two modulators 3 and 4. A first input signal A and the carrier oscillation $\omega$ are supplied to the modulator 3, while a second input signal B and the carrier oscillation $\omega+90°$ shifted through 90° is supplied to the modulator 4. The output signal of the modulator 3 is the carrier oscillator $\omega$ modulated in amplitude by the first input signal A, while the output signal of the modulator 4 consists of the phase-shifted carrier oscillation $\omega+90°$ modulated in amplitude by the second input signal B. These two output signals are added in an adding network 5 so as to produce a signal C. This signal C is a carrier oscillation of the frequency $\omega$ and with a phase angle $\alpha$ which is determined by the ratio of the two input signals. With reference to the vector diagram shown in FIG. 2, it is clear that tan $\alpha=A/B$, so that the phase angle of the signal C is proportional to the quotient of the amplitudes of the two input signals. The device furthermore comprises an amplitude limiter 6 to which the signal C is supplied and which yields a signal C′ having a substantially constant amplitude and a phase angle $\alpha$. This limited signal C′ is supplied to a phase-rectifier or synchronized detector 7. The carrier oscillation $\omega$ is also supplied to the detector 7, so that the detected signal is proportional to the sine of the angle $\alpha$. So long as the phase angle $\alpha$ is small, for example so long as A is smaller than $B/7$ or tan $\alpha$ is smaller than 0.14, the sine of the angle $\alpha$ is substantially equal to its tangent, hence the amplitude of the demodulated voltage vector, is, to a good approximation, proportional to the amplitude of the first input signal divided by the amplitude of the second input signal.

In order that the amplitude of the first input signal A may at all times be made at least seven times smaller than the amplitude of the second input signal B, an attenuator 8 (shown in broken lines) may be connected between the input terminals for the first input signal A and the corresponding input of the modulator 3.

The output voltage of the synchronized detector, which voltage is proportional to the sine of the phase angle $\alpha$, may be supplied to a non-linear amplifier 9 (shown in broken lines), having an amplification characteristic such as to render the output voltage proportional to the tan of the phase angle $\alpha$.

As shown in broken lines, the carrier oscillation having a frequency $\omega$ may be supplied to the synchronized detector 7 by way of a third modulator 10. If this carrier oscillation is modulated by a third input signal F in the modulator 10, the resulting detector output voltage is proportional to the product of the amplitudes of the first input signal A and of the third input signal F divided by the amplitude of the second input signal B.

Figure 3:
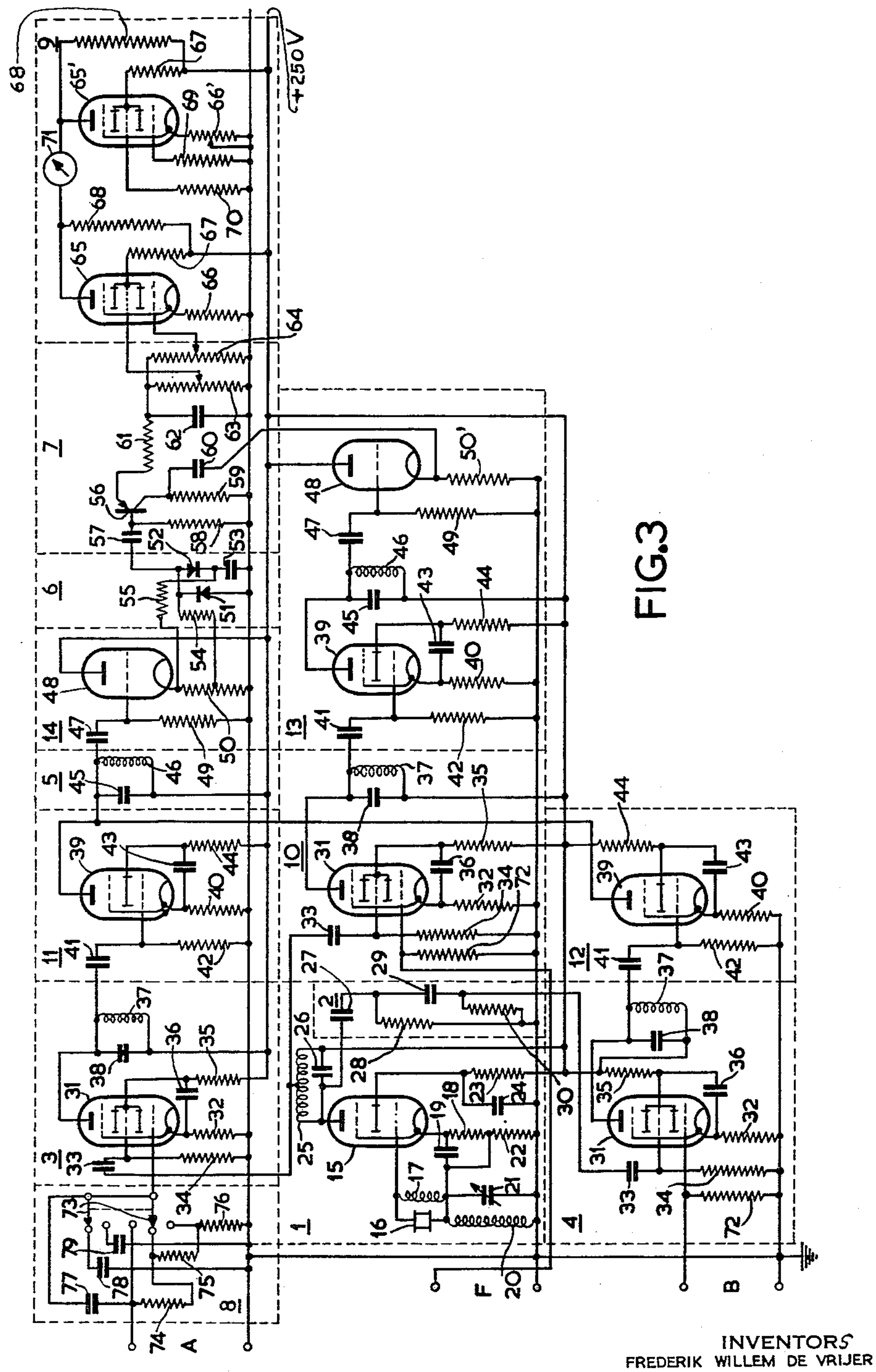
FIG. 3 is a wiring diagram of one form of the device according to the invention.

Similarly to the device described with reference to FIG. 1, the example shown in FIG. 3 comprises a carrier oscillation generator 1, a phase-shifting network 2, two modulators 3 and 4, adding means 5, a limiter 6, a synchronized detector 7, an attenuator 8, a non-linear amplifier 9 and a third modulator 10 connected between the generator 1 and the synchronized detector 7. It furthermore comprises an amplification stage 11 connected to the output of the modulator 3 and increasing the selectivity of the modulator 3. A like amplification stage 12 is connected to the output of the modulator 4, and a third amplifier 13 is connected between the third modulator 10 and the synchronized detector 7. The amplifier 13 comprises a selective pentode amplification stage and a cathode amplifier, that is to say an amplifier in anode-base arrangement the cathode of which is coupled to the detector 7. A cathode amplifier 14 is also connected between the adding means 5 and the limiter 6.

The generator 1 is a crystal generator and comprises a pentode 15, the control grid of which is connected through a crystal and a parallel-connected choke coil 17 to its cathode circuit. This cathode circuit comprises a first resistor 18 and a parallel-connected capacitor 19 in series-combination with a resonant circuit comprising an inductance 20 and a capacitor 21 connected in parallel with a second resistor 22. The common point of the resistors 18 and 22 is connected to the crystal 16 and to the inductance 17. The resonant circuit 20—21 is tuned to the crystal frequency $\omega/n$. The screen grid of the pentode 15 is connected to the positive terminal +250 v. of a source of high voltage through a resistor 23 and to earth via a decoupling capacitor 24. The anode of the pentode 15 is connected to the +250 terminal through a parallel-resonant circuit 25—26. The resonant circuit 25 and 26 is tuned to a harmonic of the crystal frequency, for example to the third harmonic having a frequency $\omega$.

The inductance 25 of the anode resonant circuit comprises a centre tap, to which the modulators 3 and 10 are coupled, so that only half the voltage across the resonant circuit 25—26 is supplied to these modulators. The phase-shifting network 2 is, however, directly connected to the anode of the pentode 15. It comprises two cascade-connected phase-shifting stages, each of which consists of a capacitor and a resistor and produces a phase-shift of 45°, so that the phase-shift throughout the network is 90° and the shifted carrier-oscillation is attenuated by 50%. The first stage comprises a first series-capacitor 27 and a first parallel-resistor 28, while the second stage comprises a second series-capacitor 29 and a second parallel-resistor 30. The second modulator 4 is coupled to the common point of the capacitor 29 and of the resistor 30.

Each of the three modulators comprises an heptode 31, the third grid of which is controlled by the carrier oscillation. Each of these grids is connected to the corresponding coupling point through a capacitor 33 and earthed through a leak resistor 34. The coupling capacitors and the leak resistors of the third grids of the three modulators all have the same value, so that the carrier oscillation applied to the third grid of the modulator 3 is in phase with that applied to the third grid of the modulator 10, while the carrier oscillation applied to the third grid of the modulator 4 has a phase-difference of 90° with regard to these carrier oscillations.

The cathode of the heptode 31 of each modulator is earthed through a resistor 32, and its first grid is coupled to the corresponding input terminal and earthed through a leak resistor. The screen grids are connected to the +250 v. terminal through series-resistors 35 and decoupled with regard to the cathode via a capacitor 36. The anode of each heptode 31 is connected to the +250 v. terminal through a parallel-resonant circuit 37, 38.

Each of the amplification stages 11, 12 and 13 comprises a pentode 39, the cathode of which is earthed through a resistor 40. The control grid of this pentode is coupled to the corresponding parallel resonant circuit 37, 38 through a blocking capacitor 41 and earthed through a leak resistor 42. Its screen grid is decoupled with respect to its cathode through a capacitor 43 and connected to the +250 v. terminal through a series-resistor 44. The anodes of the pentodes 39 of the two stages 11 and 12 are commonly connected to a parallel resonant circuit 45, 46 by way of which they are connected to the +250 v. terminal. This circuit constitutes adding means for vectorially adding together the carrier oscillation modulated with the first input signal A and the carrier oscillation shifted through 90° and modulated with the second input signal B. The resultant voltage vector C is applied to the control grid of a triode 48 through a coupling capacitor 47. This triode forms part of the cathode amplifier 14. Its control grid is earthed through a leak resistor 49, its anode is directly connected to the +250 v. terminal and its cathode is earthed through a load resistor 50.

The anode of the pentode 39 of the amplifier 13 is connected to the +250 v. terminal, by way of a resonant circuit 45, 46. The grid of a triode 48 of the amplifier 13 is coupled to the resonant circuit 45, 46 of the same amplifier through a coupling capacitor 47 and earthed through a leak resistor 49. Its anode is directly connected to the +250 v. terminal and its cathode is earthed through a load resistor 50'.

The limiter 6 comprises two diodes 51 and 52, which are connected in opposite directions and to a centre tap of the load resistor 50 of the cathode amplifier 14 through a series-resistor 54 on the one hand and to earth on the other hand, a decoupling capacitor 53 being connected in series between the diode 52 and earth. The centre tap of the resistor 50 is also connected to the output terminal of the limiter 6 through the series resistor 54, and the cathode of the triode 48 is connected to the common point of the capacitor 53 and of the diode 52 through a series-resistor 55. The diode 51 is consequently biased in the blocking direction as a result of the voltage drop across half the resistor 50, and the diode 52 is biased in the opposite direction and also in the blocking direction by the other half of said voltage drop. Hence, the limiter 6 is a bilateral limiter having a threshold level determined by the direct current through the resistor 50.

The synchronized detector 7 comprises a junction transistor 56, the base of which is connected to the output terminal of the limiter 6 through a coupling capacitor 57 and earthed through a leak resistor 58. The emitter of this transistor is earthed through a load circuit, and its collector is earthed through a resistor 59 and connected to the cathode of the triode 48 of the amplifier 13 through a coupling capacitor 60. The emitter load circuit comprises a series-resistor 61 and potentiometers 63, 64 connected in series therewith and shunted by a capacitor 62. These two potentiometers are connected in parallel and their respective movable contacts constitute two variable output points of the detector 7. Junction transistors may advantageously be used as phase rectifiers or as synchronized detectors, since they operate at a very low collector-emitter voltage, for example as low as a few tenths of a volt.

To the output points of the detector 7 are connected the first and the third grids of an heptode 65 which forms part of a non-linear amplifier 9 by means of which the voltage obtained at the output of the detector 7 and which is proportional to the sine of the phase angle $\alpha$, is converted into a voltage proportional to the tangent of this phase angle. The cathode of the heptode 65 is earthed through resistor 66, its screen grids are connected to the +250 v. terminal through a series-resistor 67 and its anode is connected to the +250 v. terminal through a load resistor 68. The non-linear amplifier comprises a second heptode 65' which is connected similarly to the heptode 65, except that its first and third grids are connected only to earth, through leak resistors 69 and 70, and its cathode is earthed through a variable resistor 66'.

A measuring device 71, for example a millivoltmeter, is connected between the anodes of the two heptodes 65 and 65'.

In order to produce, at the output of the detector 7, a voltage proportional to the quotient of the amplitude of the input signals A and B multiplied by the amplitude of a third input signal F, the first grid of the heptode 31 of the modulator 10 is connected to a third input terminal and earthed through a leak resistor 72. The first grid of the heptode 31 of the modulator 4, to which the second input signal B is supplied, is also earthed through a leak resistor 72.

The first grid of the heptode 31 of the modulator 3, to which the first input signal A is supplied, is connected to the output terminal of the attenuator 8. This attenuator permits a comparatively small ratio to be maintained between the amplitudes of the input signals A and B. The attenuator 8 comprises a double switch 73 having three positions and the movable contacts of which are connected to each other and to the output terminal of the attenuator 8. A section of the double switch 73 serves to vary the attenuation and its contacts are connected to the input terminals of the attenuator 8 and to tappings of a voltage divider. This voltage divider is made up of three series-connected resistors 74, 75 and 76, the latter of which is earthed, so that the voltage divider is connected between the input terminals for the signal A. The second section of the switch serves to compensate the input capacity of the heptode 31. The movable contact of this section is connected to the input terminal through a capacitor 77 and to the first contact of the first section of the double switch 73. Its first fixed contact is not connected and its two other fixed contacts are earthed through capacitors 78 and 79. The capacitors 77, 78 and 79 are of such values as to render the impedance at the input terminals for the signal A independent of the position of the switch 73 and the attenuation provided by the attenuator 8 independent of the frequency of the signal A. If the movable contacts of the switch 73 occupy the uppermost position, the whole input voltage is applied to the first grid of the heptode 31 of the modulator 3. In this case, the capacitors 78 and 79 are not connected in the input circuit and the capacitor 77 is short-circuited, so that only the input capacity of the first grid of the heptode 31 is effective between the input terminals A. If the switch 73 occupies its central position, the atenuator 8 produces an attenuation of, say, 10 to 3 and in the lowermost position of the switch 73 it produces an attenuation of, say, 10 to 1. In this case, the value of the resistor 75 is twice as high as that of the resistor 76, and the value of the resistor 74 is seven times as high as that of the resistor 76. Accordingly, the values of the capacitors 77, 78 and 79 are determined by the following simple expressions:

$$C_{77}=10Cg;\ C_{78}=7Cg,\ \text{and}\ C_{79}=\frac{83}{7}Cg$$

where Cg represents the input capacity of the heptode 31.

The signals A and B and, as the case may be F, which are supplied to the device may either or not comprise a direct current component. They may, for example, be two or three different signals at the input or at the output of a so-called gamma-unit or of a so-called matrix-unit of a colour television recording or receiving set. If desired, the signal A is attenuated in the attenuator 8 and subsequently supplied to the modulator 3. In this modulator, it is modulated onto the carrier oscillation produced by the generator, so that a signal of the form $A \sin \omega t$ appears at the terminals of the resonant circuit 37, 38. This signal is amplified by the amplification stage 11 and supplied to the adding means 5, while a signal $B \cos \omega t$ from the modulator 4 is also supplied to the resonant circuit 45, 46 of the adding means through the amplifier 12. The signal obtained by adding has the form $C [\sin \omega t \sin \alpha + \cos \omega t \cos \alpha] = C \cos (\omega t - \alpha)$, where $\sin \alpha = k.A$ and $\cos \alpha = k.B$. This signal is supplied to the cathode amplifier 14. The same signal taken from the output of this amplifier is limited by the limiter 6, so that a signal of the form $C' \cos (\omega t - \alpha)$ of substantially constant amplitude is supplied to the base of the transistor 56 of the synchronized detector 7.

The collector-emitter voltage of this transistor is constituted by the alternating voltage component of the output voltage of the amplifier 13. This component is a signal of a frequency $\omega$ and of the same phase as the component of the signal C′, which is proportional to the signal A. Hence, synchronous detection occurs in this transistor and its product is an output signal: $D (\sin \omega t \cos \omega t \cos \alpha - \sin^2 \omega t \sin \alpha) = D [\sin \omega t \cos \omega t \cos \alpha - (1-\cos^2 \omega t) \sin \alpha]$. By means of the smoothing filter made up of the series-resistor 61 and the parallel 62 all the components comprising the comparatively high frequency $\omega$ are sieved out, hence only a voltage $E \sin \alpha$ remains.

If the signal supplied to the collector of the transistor 56 is modulated by a third input signal F, the detected signal at the output of the synchronized detector 7 is $F \times E \sin \alpha$, where A $$\sin \alpha = \sqrt{A^2 + B^2}$$

In order to convert this signal proportional to $\sin \alpha$ into a signal proportional to $\tan \alpha$, it is simultaneously supplied with different variable amplitudes and to the third grid of the heptode 65. This double control of the heptode 65 results in non-linear amplification and since the heptode operates far from its range of saturation, for example since the bias produced across the resistor 66 is comparatively high, this amplification increases with the positive value of the control voltage. Together with the heptode 65, the heptode 65′ constitutes a bridge circuit, hence the voltage difference across the millivoltmeter 71 is substantially independent of supply voltage variations.

If the signal A has an amplitude exceeding that of the signal B, the result is no longer exact, since, even when using the maximum attenuation of the attenuator 8, the increase in amplification of the heptode 65 is no longer sufficient to convert the output voltage of the detector proportional to the sine of the angle $\alpha$ into a voltage proportional to the tangent of the same angle $\alpha$. In this case, the signals A and B may be interchanged, the measuring instrument 71 then requiring a double scale division. For example, the normal scale division may cover the range of from 0 to 0.15 and, in the case of interchanged input signals, provision may be made of a second, converse scale division covering the range of from $\infty$ to 0.666. Hence, provision may be made of two different scale divisions for any attenuation stage of the attenuator 8, which scale divisions permit both the quotient $A/B$ and the quotient $E/A$ to be read.

The device as described may be employed for various communication purposes. In the "Proceedings of the I.R.E." of January 1954 (pages 174 to 191) a method due to Brewer Ladd and Piney is proposed for brightness compensation of colour television signals by means of automatic gain control. According to this method, a compensation signal A proportional to $$\frac{1}{R^{k1} \times K^{k2} \times B^{k3}}$$

is produced, wherein R, G and B represent the values of the red, green and blue signal voltages respectively and $k_1$, $k_2$ and $k_3$ represent exponents smaller than approximately 0.3. The amplification in each channel is regulated, by means of the compensation signal A, thus obtaining the colour signals $R'=A.R$; $G'=A.G$. and $B'=A.B$. The device as described may, for example, by employed for producing the compensation signal A. Starting with the signals $R^{k1}$, $G^{k2}$ and $B^{k3}$, the quotient $$\frac{1}{R^{k1}}$$

may be produced in a first device, which quotient may subsequently be divided by $G^{k2}$ and by $B^{k3}$.

A further solution of the same problem consists in applying the usual brightness or $\gamma$ correction of the brightness signal, as is customary in monochrome television, and forming the quotient $$A=\frac{H'}{H}$$

where H represents the brightness signal and H′ is the corrected brightness signal. The colour signals G, R and B are then corrected by multiplication by the quotient A, so that the corrected colour signals are $G'=A.G$; $R'=A.R$ and $B'=A.B$. A device according to the invention may then be used for forming the quotient A.

The uses in analog computers are numerous and obvious. Alternatively, chemical or physical operations are controllable or regulable by means of a device according to the invention, for example the relative ratio between two materials can be controlled or maintained constant.

What is claimed is:

1. An electrical circuit for producing an output voltage having an instantaneous amplitude proportional to the instantaneous amplitude of a first input signal divided by the instantaneous amplitude of a second input signal, the amplitude of said second signal being at least several times larger than that of said first input signal, said circuit comprising in combination: a generator for producing a carrier oscillation having a frequency which is large relative to the highest frequency of any component of either said first or said second input signals, a phase shifting network for shifting the phase of said carrier oscillation through 90°, first and second signal input means for said first and second input signals respectively, first and second modulator means coupled to said first and second signal input means respectively, said first modulator means having supplied thereto the unshifted carrier oscillation and said first input signal, said second modulator means having supplied thereto said second input signal and phase shifted carrier oscillation from said phase shifting network, adding means having supplied thereto the outputs of said first and second modulators and producing a resulting carrier oscillation of an amplitude proportional to the vectorial sum of the outputs of said first and second modulators, a limiter for maintaining the amplitude of said resulting carrier oscillations at a constant value, and a synchronized detector having supplied thereto the limited resulting carrier oscillation and the unshifted carrier oscillation, said detector producing a detected output voltage having an instantaneous amplitude proportional to the instantaneous amplitude of the first input signal divided by the instantaneous amplitude of the second input signal.

2. A device as claimed in claim 1, further comprising attenuation means preceding the first modulator means for reducing at will the amplitude of the first input signal.

3. A device as claimed in claim 1, characterized in that it furthermore comprises a non-linear amplifier to which is supplied said detected output voltage.

4. An electrical circuit for producing an output voltage having an instantaneous amplitude proportional to the product of the instantaneous amplitude of a first input signal and a third input signal divided by the instantaneous amplitude of a second input signal, the amplitude of said second signal being at least several times larger than that of said first input signal, said circuit comprising in combination: a generator for producing a carrier oscillation having a frequency which is large relative to the highest frequency of any component of any of said input signals, a phase shifting network for shifting the phase of said carrier oscillation through 90°, first, second and third signal input means for said first, second and third input signals respectively, first, second and third modulator means coupled to said first, second and third signal input means respectively, said first modulator means having supplied thereto the unshifted carrier oscillation and said first input signal, said second modulator means having supplied thereto said second input signal and the phase shifted carrier oscillation from said phase shifting network, said third modulator means having supplied thereto said unshifted carrier oscillation and said third input signal, adding means having supplied thereto the outputs of said first and second modulators and producing a resultant carrier oscillation of an amplitude proportional to the vectorial sum of the outputs of said first and second modulators, a limiter for maintaining the amplitude of said resulting carrier oscillations at a constant value, and a synchronized detector having supplied thereto the limited resulting carrier oscillation and the output of said third modulator means, said detector producing a detected output voltage having an instantaneous amplitude proportional to the product of the instantaneous amplitude of the first input signal and the third input signal divided by the instantaneous amplitude of the second input signal.

5. A device as claimed in claim 4, further comprising attenuation means preceding the first modulator means for reducing the amplitude of the first input signal.

References Cited in the file of this patent

UNITED STATES PATENTS

| | | |
|---|---|---|
| 2,525,496 | McCann | Oct. 10, 1950 |
| 2,840,307 | Campbell | June 24, 1958 |

OTHER REFERENCES

Review of Scientific Instruments (Meyer et al.), December 1954, pp. 1166–1172.

Waveforms (Chance et al.), 1949; page 673.

Electronic Analog Computers (Korn and Korn), 1952, page 305.

Radio Electronics (Hindall et al.), February 1951, pp. 76–77.

Association for Computing Machinery (Edwards), January 1954, pp. 32 and 33.